United States Patent [19]

Pacca

[11] Patent Number: 4,787,131

[45] Date of Patent: Nov. 29, 1988

[54] METHOD OF INSTALLING REPLACEMENT WINDOWS

[76] Inventor: Stephen R. Pacca, 150 Overlook Ave., Apt. 15F, Hackensack, N.J. 07601

[21] Appl. No.: 102,003

[22] Filed: Sep. 28, 1987

[51] Int. Cl.[4] ........................ B21K 21/16; B23P 17/04; B23P 23/00

[52] U.S. Cl. .................................. 29/401.1; 29/426.4; 29/458; 49/147; 49/406; 49/445; 49/447; 52/204; 52/404; 52/743

[58] Field of Search .................... 29/401.1, 426.4, 458; 49/445, 447, 380, 147, 406; 52/743, 404, 204, 206, 210

[56] References Cited

U.S. PATENT DOCUMENTS

| | | | |
|---|---|---|---|
| 1,500,359 | 7/1924 | Auld | 49/447 |
| 1,940,796 | 12/1933 | Gollnick | 49/447 |
| 1,995,233 | 3/1935 | Triller | 49/506 |
| 2,292,301 | 8/1942 | Smith | 49/447 |
| 2,745,149 | 5/1956 | Etling | 49/506 |
| 2,761,173 | 9/1956 | Dinsmore | 49/445 X |
| 2,988,491 | 6/1961 | Kantor et al. | 49/506 X |
| 3,798,869 | 3/1974 | Nipp | 52/743 |
| 4,336,644 | 6/1982 | Medlin | 29/401.1 |
| 4,385,477 | 5/1983 | Walls et al. | 52/743 |

*Primary Examiner*—Charlie T. Moon
*Attorney, Agent, or Firm*—Charles E. Baxley

[57] ABSTRACT

A double-hung window having a casing with side boards inwardly delimiting sash pockets is replaced by first stripping the casing of the sashes, then filling the sash pockets with fluent particulate insulation, and finally fitting a replacement window into the casing. These holes can be the ones left by removal of the sash-cord pulleys, or can be specially made. The insulation is cellulose and is filled into the pockets by being pumped thereinto. Furthermore on stripping of the sashes same are separated from the respective sash weights which are left in the respective sash pockets.

4 Claims, 1 Drawing Sheet

METHOD OF INSTALLING REPLACEMENT WINDOWS

FIELD OF THE INVENTION

The present invention relates to a method of installing a replacement window. More particularly this invention concerns the replacement of a standard weight-type double-hung window.

BACKGROUND OF THE INVENTION

A standard double-hung window has a pair of sashes that are vertically slidable next to one another in a rectangular casing formed by vertical side boards and horizontal top and sill boards. The upper sash is guided between an outer stop and a parting strip and the inner sash As described in U.S. Pat. No. 1,514,513 of Flemming the side boards are spaced inward of the rough frame or masonry opening so as to form two sash pockets or boxes. In addition each of the sashes is suspended from two sash cords which in turn each have an inner end connected to the respective edge of the respective sash and an outer end to a respective weight in the respective sash box. These cords, which may be rope or chain, are reeved over respective pulleys set in the tops of the respective side boards so that as each sash moves up the respective weights move down and vice versa.

The standard upgrade for such an obsolete window is to remove both sashes and fit the casing with a replacement window itself constituted as a rectangular frame containing two new sashes. This replacement window has the necessary channels and balancers for guiding and holding the new sashes.

Thus the replacement procedure entails pulling off the inner stops and parting strips, cutting the sash cords, and removing the old sashes. The sash weights drop to the bottom of the respective sash pockets and are left there. Then the pulleys are removed, as they project into the window opening, the replacement is fitted in place against the outer stop, and the inner stops are replaced to hold the new window in. The replacement window fits the casing tightly and normally engages it with foam insulation so as to form a weathertight fit.

While such a procedure greatly reduces heat loss through the window itself, the pockets remain substantially empty. Even though a dead-air space has some insulation value, the sash pockets themselves are deep enough for convection currents to occur, so that considerable heat loss can occur to each side of the new replacement window at these sash pockets and condensation can cause further problems.

OBJECTS OF THE INVENTION

It is therefore an object of the present invention to provide an improved method of installing a replacement window.

Another object is the provision of such a method of installing a replacement window which overcomes the above-given disadvantages, that is which eliminates the subsequent heat loss through the empty sash pockets.

SUMMARY OF THE INVENTION

A method of replacing a double-hung window having a casing with side boards inwardly delimiting sash pockets according to the invention comprises the steps of stripping the casing of the sashes, then filling the sash pockets with fluent particulate insulation, and finally fitting a replacement window into the casing. In this manner it is possible not only to reduce heat losses through the window, but therearound through the sash pockets.

According to a further feature of this invention the pockets are filled through holes at the top of the casing and these holes are covered by the replacement window on fitting of same into the casing. These holes can be the ones left by removal of the sash-cord pulleys, or can be specially made.

The insulation according to this invention is cellulose and is filled into the pockets by being pumped thereinto. Furthermore on stripping of the sashes same are separated from the respective sash weights which are left in the respective sash pockets. Thus the procedure according to this invention hardly complicates the task of replacing the obsolete window, while giving a much better job.

DESCRIPTION OF THE DRAWING

The above and other features and advantages will become more readily apparent from the following, reference being made to the accompanying drawing in which.

SPECIFIC DESCRIPTION

Figure 1:
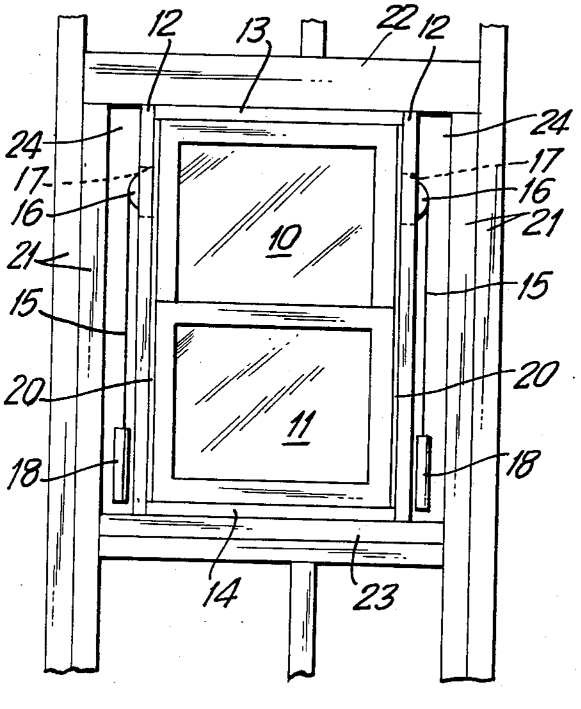
FIG. 1 is an elevation view of a standard double-hung window, the inside trim and wall covering removed for clarity of view.

As seen in FIG. 1 a standard double-hung window has an upper sash 10 and a lower sash 11 received in a casing constituted by identical side boards 12 and top and bottom boards 13 and 14. Each of the sashes 10 and 11 is suspended from a pair of sash cords 15 (of which only the two for the bottom sash 11 are visible in the drawing) that are reeved over pulleys 16 received in holes 17 formed in the upper ends of the side boards 12. These cords 15 have inner ends secured to the respective sashes and outer ends to respective sash weights 18. The upper sash 10 is received between outer stops 19 (see FIG. 2) and a parting strip (not visible in the drawing) and the lower sash between this parting strip and inner stops 20 The casing constituted by the boards 12, 13, and 14 is received in a rough opening formed here by studs 21, a lintel 22, and a sill 23. The studs 21 are spaced out from the side boards 12 to form pockets or boxes 24 that extend vertically the full length of the side boards 12 between these boards 12 and the studs 21. These pockets 24 contain the respective weights 18 and are closed on the outside by the sheathing and on the inside by whatever wall covering, e.g. gypsum board, is used.

Figure 2:
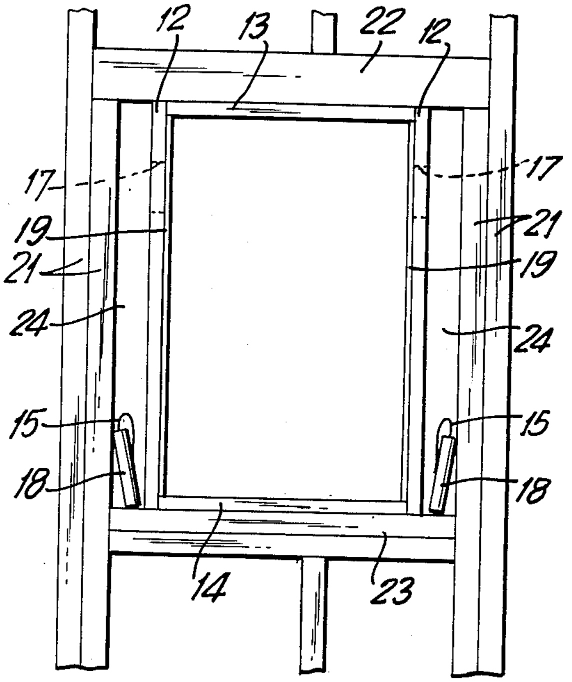
FIGS. 2 through 4 are views like FIG. 1 illustrating in partly diagrammatic form the successive steps of the method of this invention.

The first step in replacing the window entails removing the inner stops 20, cutting the cords or chains 15 for the lower sash 11, and removing this sash 11. Then the parting strips are removed, the cords 15 for the upper sash 10 are cut, and this sash 10 is removed. Finally the pulleys 15 are removed. This leaves the window as shown in FIG. 2 with the weights 18 sitting in the bottoms of the pockets 24 and the holes 17 open.

Figure 3:
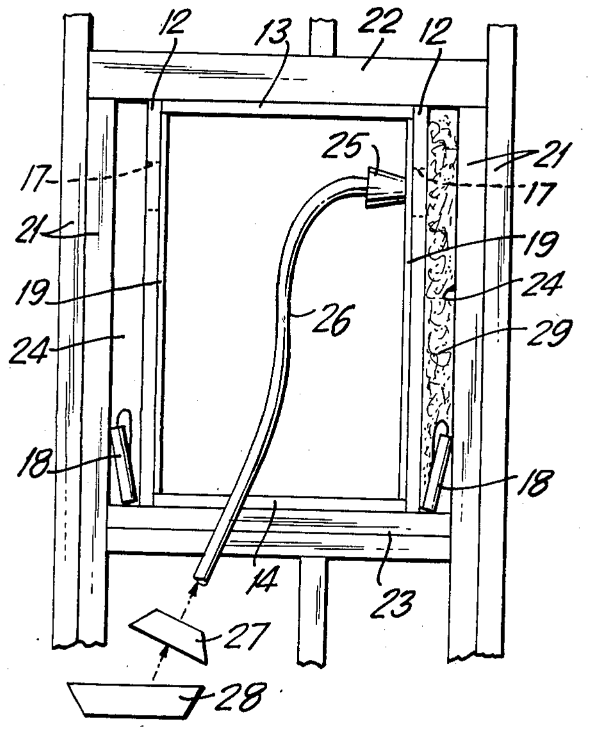

Then as shown in FIG. 3 a nozzle 25 connected via a hose 26 and a blower 27 to a supply 28 of bag cellulose is fitted to each hole 17 and the pockets 24 are filled with masses 29 of cellulose. In standard stud-wall construction it is possible to obtain a rating of R13 with masses 29 about 4 in thick. This is substantially better than the rating of a comparable dead-air space.

Figure 4:
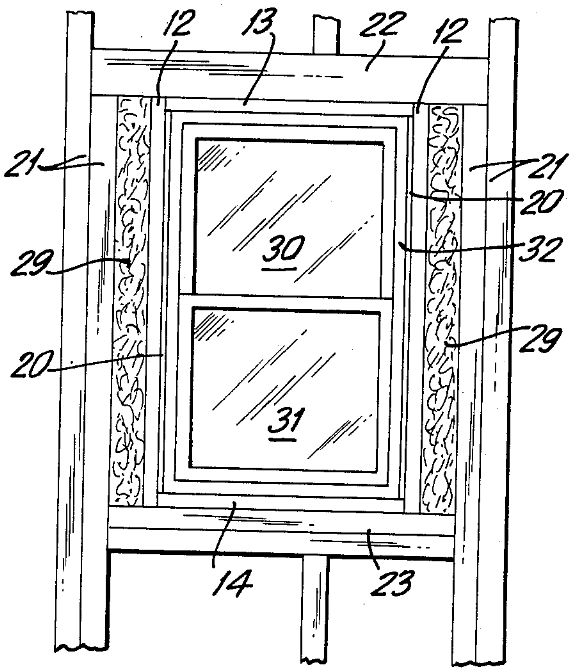

Finally a replacement window having upper and lower sashes 30 and 31 and a frame 32 with built-in balancers is fitted to the casing 12, 13, 14 and the outer stops 20 are reinstalled as shown in FIG. 4. The installation is complete and not only is the window itself upgraded greatly, but even the wall surrounding the window has been improved substantially from an energy point of view.

I claim:

1. A method of replacing a double-hung window having a casing with side boards inwardly delimiting sash pockets, the method comprising the steps of sequentially:

stripping the casing of the sashes;

filling the sash pockets with fluent particulate insulation; and fitting a replacement window into the casing.

2. The method defined in claim 1 wherein the pockets are filled through holes at the top of the casing, the method further comprising the step of covering the holes with the replacement window on fitting of same into the casing.

3. The method defined in claim 1 wherein the insulation is cellulose and is filled into the pockets by being pumped thereinto.

4. The method defined in claim 1 wherein on stripping of the sashes same are separated from the respective sash weights and same are left in the respective sash pockets.

* * * * *